US012572332B2

(12) United States Patent
Narasimha et al.

(10) Patent No.: US 12,572,332 B2
(45) Date of Patent: Mar. 10, 2026

(54) METHOD FOR EXTRACTING THE STRUCTURE OF AN INPUT FOR A BINARY PROGRAM

(71) Applicant: UNIVERSITY OF LOUISIANA LAFAYETTE, Lafayette, LA (US)

(72) Inventors: Seshagiri Prabhu Narasimha, Lafayette, LA (US); Arun Lakhotia, Lafayette, LA (US)

(73) Assignee: UNIVERSITY OF LOUISIANA AT LAFAYETTE, Lafayette, LA (US)

( * ) Notice: Subject to any disclaimer, the term of this patent is extended or adjusted under 35 U.S.C. 154(b) by 374 days.

(21) Appl. No.: 18/110,835

(22) Filed: Feb. 16, 2023

(65) Prior Publication Data

US 2023/0266948 A1 Aug. 24, 2023

Related U.S. Application Data

(60) Provisional application No. 63/311,489, filed on Feb. 18, 2022.

(51) Int. Cl.
*G06F 9/44* (2018.01)
*G06F 8/30* (2018.01)

(52) U.S. Cl.
CPC ..................................... *G06F 8/30* (2013.01)

(58) Field of Classification Search
CPC ......................................................... G06F 8/30
See application file for complete search history.

(56) References Cited

U.S. PATENT DOCUMENTS

| | | | | |
|---|---|---|---|---|
| 2008/0059621 A1* | 3/2008 | Raghavan | ................. | G06F 8/30 |
| | | | | 709/224 |
| 2011/0314337 A1* | 12/2011 | Sinha | .................. | G06F 11/3624 |
| | | | | 714/E11.029 |
| 2012/0290883 A1* | 11/2012 | Kahlon | ............... | G06F 11/3636 |
| | | | | 714/49 |
| 2012/0317647 A1* | 12/2012 | Brumley | ............... | G06F 21/577 |
| | | | | 726/25 |
| 2019/0311131 A1* | 10/2019 | Hassanshahi | ........... | G06F 8/433 |
| 2020/0143061 A1* | 5/2020 | Kim | ...................... | G06F 21/566 |
| 2022/0067172 A1* | 3/2022 | Bonetta | ................... | G06F 8/427 |

* cited by examiner

*Primary Examiner* — Qamrun Nahar
(74) *Attorney, Agent, or Firm* — Ted. M. Anthony; Sarah B. Dupont

(57) ABSTRACT

Herein disclosed is a method for automatically automatically infer a recursive state machine (RSM) describing the space of acceptable input of an arbitrary binary program. This method automatically identifies atomic fields of fixed and variable lengths and syntactic elements, such as separators and terminators, and generalizes them into regular expression tokens. It constructs an RSM of tokens to represent structures such as arrays and records. Further, it constructs nested states in RSM to represent complex, nested structures. The RSM may serve as an independent parser for the program's acceptable input.

2 Claims, 4 Drawing Sheets

```
<Unit>          ::=     0x0 | ... | 0xFF |
                        LOWER_HEX | UPPER_HEX |
                        LOWER | UPPER |
                        DIGIT | XDIGIT |
                        ALPHA | ALNUM |
                        WHITESPACE | PUNCTUATION |
                        CONTROL | PRINTABLE |
                        ALL <End>           ::=     $ | +

<Token>         ::=     List<Unit> <End>
```

FIGURE 2

METHOD FOR EXTRACTING THE STRUCTURE OF AN INPUT FOR A BINARY PROGRAM

CROSS-REFERENCE TO RELATED APPLICATIONS

This application claims priority to U.S. Provisional Application No. 63/311,489 filed on Feb. 18, 2022 titled "Method for Extracting the Structure of an Input for a Binary Program."

STATEMENT REGARDING FEDERALLY SPONSORED RESEARCH OR DEVELOPMENT

Not applicable.

FIELD OF THE INVENTION

The field of this invention relates to software engineering and dynamic computing analysis. More specifically, this invention relates to the field of inferences in recursive state machines to evaluate programs for improvements and development.

BACKGROUND INFORMATION

Recursive state machines (RSMs), also known as finite state machines, can enhance the computing power of ordinary state machines and are popular in computing applications. For model-driven software engineering, reliance on pre-existing software models and software artifacts can be helpful. But such relieance is difficult when aspects of the software such as acceptable input structures are unknown or undeterminable.

Early efforts related to the problem being investigated aimed at automatically reverse engineering network protocol messages. These early efforts—used dynamic taint analysis (DTA) to monitor the flow of data through a network program to, in effect, construct a parse tree of its input. While these efforts partitioned the sequence of bytes of an input into a hierarchy of subsequences, they did not further abstract those subsequences. Also, since network protocol messages do not have very complex structures or arbitrary levels of nesting, these methods limited themselves to parsing simple structures.

Recent works in the art have gone beyond constructing parse trees of input and can generate human-readable grammar of the space of a program's input. One method known in the art tracks the direct data flow of the input bytes into different variables in a white-box manner for Java programs. However, that implementation is limited to reconstructing grammars of "scannerless recursive descent parsing with optional lookahead." Another method recovers grammar from dynamic control flow and how parsing functions access bytes in an initial input buffer, and it does not propagate taint beyond the initial input buffer. Both these methods annotate these bytes on the function call trace of the program and use the calling relationships in the trace to create grammar rules, and their rule construction relies on how function calls flow in a recursive descent parser. Furthermore, these known methods expect that the input is a stream of ASCII characters and that the parser constitutes a distinct phase in the program.

Identifying input structures is important particularly for 1) analyzing programs of unknown provenance, for instance, analyzing malware, 2) analyzing programs with known origin when their documentation may either not be available or be obsolete and 3) when, even though the well-documented grammar of a program's input is available, for instance, the PDF file format specification that is described in a 1,300-pages (PDF) document, there is a need that the structure is available in a machine-processable format, such as to perform fuzzing for vulnerability discovery or exploit generation.

SUMMARY OF THE INVENTION

Disclosed herein is a method for inferring a recursive state machine (RSM) that describes the space of acceptable input of an arbitrary binary program by analyzing it using dynamic taint analysis (DTA) with one or more valid input data.

There are several significant benefits of this disclosed method. First, the method does not require a distinct parser, or any particular parsing strategy. While the method will work with inputs that are ASCII encoded, the method does not rely on that encoding. Second, the method will encode structural elements extracted as an RSM, where nodes are regular expression tokens. Third, the method represents complex, nested structures as recursive state machines, and it does so irrespective of whether the program processes recurring elements in the input using loops, recursion, or any combination thereof. Fourth, the different state machines inferred from different input data can be joined to create a single abstract state machine.

The method extracts the structure of the inputs of a program by executing it with one or more input data. The structure developed consists of state machine that identifies records, arrays, separators, terminators, and nested structures in the input.

Given a well-formed input and a program that processes the input data, the method to discover the structure of the input data consists of the following steps:

Track taint. Using a context-aware dynamic taint tracker that tracks the data flow at a byte-level granularity, produce a taint-trace, comprising a sequence of tuples, where each tuple consists of the instruction executed, the calling context, and the instruction operands' taints of the values.

Identify field values. Two consecutive bytes constitute a field's value if used together at the same set of instructions and in the same calling context. The set of instructions and calling contexts where a field value is accessed is called the Source Index (SI). From the taint-trace, identify field values and their source indexes.

Construct taint interval graph (TIG) tree. A graph representing the transitively reduced subset relations of all unique field values is called a Taint Interval Graph (TIG). Construct a TIG and convert it into a tree by splitting overlapping intervals and inserting 'gap intervals' for missing intervals. Perform a level order traversal of the tree and order the nodes on their interval start offset. In the TIG tree, annotate two properties: (a) SI.is_repeating: if SI occurs more than once in TIG nodes; and (b) tig_node.has_repeating_si: if any descendants of the tig_node, including itself, have repeating SI.

Derive source index tokens. Generalize the field values associated with the source index to create a token. Generalize these values by joining them over a lattice of sets, such as LOWER HEX, LOWER, UPPER HEX, UPPER, DIGIT, ALPHA, XDIGITS, ALNUM, WHITESPACE, CONTROL, and ALL.

Infer field types. Each field has associated with it a set of values accessed by a set of instructions. Classify each instruction in the set that accesses the values of a field based on the computation type it performs, such as Comparison, Arithmetic, and String types. Further, based on the type of all instructions in the set using values of the field, infer the field type, such as Counter, Enumerated, Numeric, and String.

Construct structure transition graph (STG). To construct the STG, first identify TIG nodes with the same SI values. If there are multiple nodes in the tree with the same SI, they must belong to an array. We define an array node as a node in TIG with a repeating SI. An array node in TIG not contained in the subtree of another array node is called the topmost array node.

Next, construct a frontier of TIG nodes. A sequence of TIG nodes, ordered on their interval start offset, is termed a frontier if their interval spans the entire input data and the interval offsets of consecutive pairs of nodes in the sequence do not overlap. In one embodiment, a TIG may have many frontiers where each represents a decomposition of the input into fields. Frontiers differ on the level of granularity in which they decompose the input. There are multiple ways to construct frontiers from TIG. Two preferred methods are disclosed to construct frontiers, both anchor around array nodes. Furthermore, both the method methods choose the topmost array nodes, deferring the problem of discovering nested structures and embedded arrays to the recursive step. The two methods are: (a) flattened_reps method, which produces a frontier with low granularity; and (b) highest-ed_reps method, which produces a frontier with high granularity.

Third, construct STG nodes. For every unique SI in the frontier, create a node in the STG; enables referring an STG with its SI. Identify the STG node with a TIG node tk in frontier by SI(tk). Mark the leading and trailing nodes of the frontier sequence as start and terminal nodes. Then, add STG edges. For every consecutive pair, ti and ti+1 of TIG nodes in the frontier sequence, in STG, add an edge from SI(ti) to SI(ti+1).

Recurse. When the TIG nodes in the frontier are not leaf nodes, they are the values of non-atomic fields; this is more so when the subtree rooted at the TIG nodes further contains repeating SIs, implying the structure contains nested arrays. Refine the structure of repeating non-leaf TIG nodes in frontier by applying the structure discovery algorithm recursively on the value at each such TIG node and joining the structures discovered at individual TIG nodes.

BRIEF DESCRIPTION OF THE DRAWINGS

The drawings constitute a part of this specification and include exemplary embodiments of the METHOD FOR EXTRACTING THE STRUCTURE OF AN INPUT FOR A BINARY PROGRAM, which may be embodied in various forms. It is to be understood that in some instances, various aspects of the invention may be shown exaggerated or enlarged to facilitate an understanding of the invention. Therefore, the drawings may not be to scale

FIG. 2 provides the structure of a token.

DETAILED DESCRIPTION OF THE INVENTION

Figure 1:
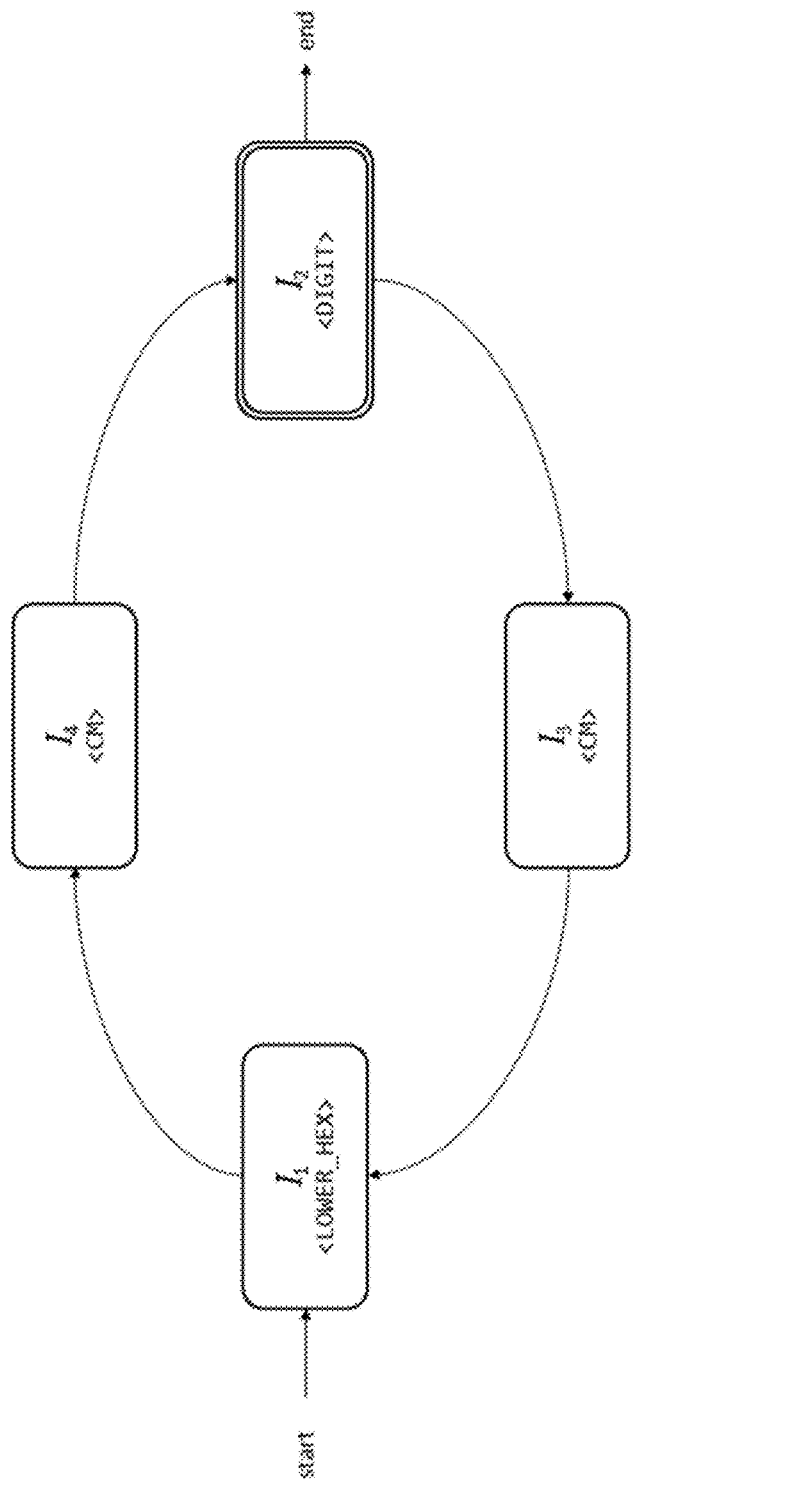
FIG. 1 is a flow chart of a state machine of a program run with the input "a, 1, b, 2".

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

Prior to discussing the method, it is important to define terms used in this disclosure.

Fields. Though a program may receive a variety of inputs, inputs preferably are provided as a sequence of bytes, such as from a command line, a file, or the network. In one embodiment, the term string may be used to denote an arbitrary sequence of bytes. Each complete string is considered a single input. What constitutes a complete string is left to the implementation. For example, in one embodiment, the entire contents of a file may be considered a string. In another embodiment, a part of the contents of a file may be considered a string. Processing of an input string and constructing a data structure, a process known as parsing or deserialization, depends on how the input string was constructed. A program may also parse the input and take some action without constructing any data structure. In the preferred embodiment, the input is a serialized representation of a data structure and the program deserializes it. A data structure consists of fields which may be atomic or composite. A field is atomic if it is of an atomic type in the programming language used. It may be either fixed-length, such as an integer type, or variable-length, such as a string type. A composite field is made of a collection of other fields. An array is a composite field consisting of a (potentially) variable-length sequence of values of the same type of field. A record is a composite field consisting of a sequence of values of different types of fields. A variant record is a composite field in which the value of one field is used to determine the number and types of the other fields.

Values. Each atomic field of a data structure is populated with a specific value. For instance, an integer field may be populated with the value 10. There may be an infinite number of possible values for any atomic field. The primary assumption is that when serialized, a value of an atomic field translates to a contiguous sequence of bytes. Even though an atomic field may be fixed length in the data structure, its value, when serialized, need not be. For instance, a 4-byte integer-valued field may be serialized to four bytes in little-endian or big-endian encoding, or a variable-length string of ASCII digits in an ASCII encoding. Thus, in the preferred embodiment, a value is an arbitrary length sequence of bytes. No other constraints are imposed on how composite data structures are serialized. Thus, the values of the fields of a record need not appear in any particular order. Similarly, values of arrays may also appear in whichever order.

Tokens. A token is the abstract representation of the values of a field. To enable this generalization, we introduce a structure, "Token", defined by the grammar in FIG. 2. A token, an element of Token, is a constrained regular expression over the alphabet Unit, the grammar of which is also shown in FIG. 2. The regular expression is constrained to be a non-empty sequence of symbols of Unit that is either complete, terminated by a $, or incomplete, terminated by a +. Each symbol of the alphabet Unit represents a set of 8-bit binary values. Unit contains symbols representing each of the 28 singleton sets, one for each possible 8-bit value. Unit also contains symbols representing multi-valued sets, such as LOWER HEX, UPPER HEX, etc. Sets represented by multiple symbols of Unit contain the raw 8-bit values. A sequence of symbols of Unit represents the set of all possible sequences of raw bytes created by replacing a symbol with an arbitrary byte represented by that symbol. All the sequences of raw bytes represented by a sequence of symbols over Unit are of the same length. A token may be a complete or an incomplete sequence of symbols over Unit. A complete sequence of symbols represents a set of fixed-length sequences of raw bytes. An incomplete sequence of symbols is a shorthand for a set of complete sequences of symbols where the last symbol repeats one or more times. Thus, an incomplete sequence of symbols represents the set of raw bytes sequences that belong to any complete sequences of symbols resulting from one or more repetitions of the last symbol.

To generalize a set of values, first map each value to a token (of Token) and then iteratively pairwise join them. Thus, a value maps directly to a complete sequence by mapping each raw byte to a Unit symbol representing the singleton set containing that byte—for instance, the two-byte value 0x1337 maps to a sequence: (0x13, 0x37). The pairwise join of tokens is defined using two operations: (1) JoinUnits, which joins two Units; and (2) JoinTokens, which joins two tokens of Token.

Figure 3:
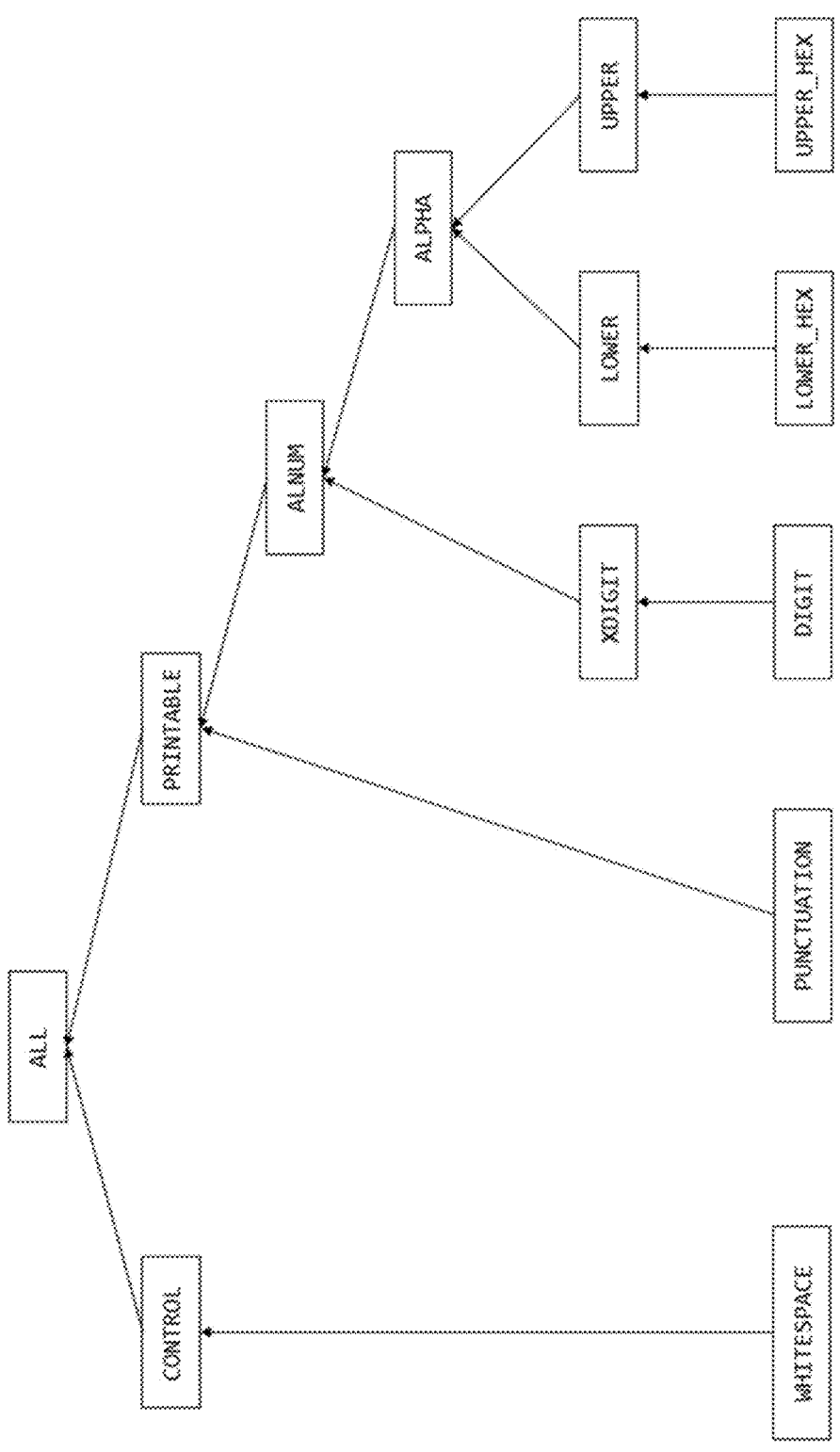
FIG. 3 provides the Hasse diagram of ASCII character classes ordered by poset≤relation.

The subset relation of the sets in the symbols of the Unit enables partial ordering of Unit symbols. FIG. 3 presents a Hasse-diagram representing the partial order for the Unit symbol sets with multiple values and may be extended naturally to include the 28 singleton sets. The partial order over symbols of Unit define the operation JoinUnits using the join operation over a Hasse lattice. The join of a Unit symbol with itself yields the same symbol. Joining two different Unit symbols yields the symbol representing the nearest common parent. For instance, JoinUnits(LOWER, UPPER) yields ALPHA and JoinUnits(0x1, 0x0A) yields CONTROL.

The Listing below presents one embodiment of the method for JoinTokens. For two tokens with an equal number of Unit symbols, perform the sequential pairwise join of their corresponding Unit symbols, producing the same length Unit symbol sequence. For two tokens with an unequal number of Unit symbols, their join produces a Unit sequence with the length of the smaller sequence resulting from joining corresponding Unit symbols and joining excess Unit symbols from the longer sequences with the last Unit symbol of the shorter sequence. The result of a join is incomplete if either of the sequences joined are incomplete or if the sequences are of unequal length. Otherwise, the join is complete. For instance, JoinTokens((0x00, 0x0A), (0x00, 0x20)) yields (0x00, CONTROL$) and JoinTokens((0x61, 0x62), (0x61, 0x65, 0x31)) yields (0x61, XDIGIT+).

An overview of the method will first be provided. Given a program and a sequence of bytes as its input, the method creates a state machine representing a subset of the program's input space. The nodes of the state machine will be tokens consisting of regular expressions. Each complete sequence of transitions from the start node to a final node in the state machine would represent one possible input to the program. Note that tokens are annotated on nodes instead of edges, as done in a classic state machine. More generally, to represent nested structures, the node of a state machine may refer to another state machine, producing potentially recursive state machines.

An RSM node may represent either an atomic state or a nested state when referring to another state machine. Each state machine has a well-defined interface consisting of start and final nodes and edges connecting nodes. An edge entering a nested state models the invocation of the state machine associated with that node, and an edge leaving a state machine referred by a nested node corresponds to a return from that nested state.

The key insights underlying the method to identify fields are: (a) Heuristic 1: Consecutive bytes in the input form the value of the same field if some instruction uses all those bytes during the same invocation; and (b) Heuristic 2: Two bytes in the input belong to the same field of a data structure if the same set of instructions uses them.

An instruction of a program uses a byte of a given input if when the program is executed with that input, the said instruction is invoked with operands whose values are computed using the said byte. We also use the term value to identify any syntactic unit more generally, including keywords, separators, and terminators.

To illustrate the idea, consider a program with instructions $I_1$, $I_2$, $I_3$, and $I_4$ that when executed with the input "a,1,b,2" produces the following usage tuples: "a": $I_1$, ",": $I_3$, "1": $I_2$, ",": $I_4$, "b": $I_1$, ",": $I_3$, and "2": $I_2$, where "x": $I_j$ means the byte "x" is used at instruction L.

Using Heuristic 1 above, it can be inferred that each byte of the input forms a value of some field and that there is no value with multiple bytes since no instruction uses two contiguous bytes. Using Heuristic 2 above, it can be inferred that bytes "a" and "b" are values of the same field since they are both used at instruction $I_1$, and that bytes "1" and "2" are values of the same field since they are both used at instruction $I_2$, that the first and third commas are values of the same field as they are used at instruction $I_3$, and the second commas is the value of another field. Since values used at the same set of instructions highly likely belong to the same field, we can use the (sets of) instructions to denote fields. Thus, in our example, the four groups of field values may be denoted by the singleton sets of instruction $I_1$, $I_2$, $I_3$, and $I_4$.

After identifying the fields in the input and the sets of bytes representing their values, the next step is to construct a state machine, performed in two steps. First, create a graph representing the structure of the state machine, where each node in the graph represents a field. Second, populate each node with tokens computed from values belonging to the corresponding field.

To construct the graph structure, first, partition the input into a sequence of values, and from it, compute a sequence of fields by replacing each value with the field it belongs to, i.e., set of instructions. Thus, the input "a,1,b,2" translates to the sequence of values ("a", ",", "1", ",", "b", ",", "2") and then to the sequence of fields ($I_1$, $I_3$, $I_2$, $I_4$, I1, $I_3$, $I_2$). The goal is to create a directed graph with a start and a final node such that this sequence of fields represents a path from the start node to the final node. To achieve this goal, create a graph with a node per field, that is $I_1$, $I_2$, $I_3$, and $I_4$, and the edges reflecting the consecutive ordering in the field sequence. That is, there are edges from $I_1$ to $I_3$, $I_3$ to $I_2$, $I_3$ to $I_2$, and $I_4$ to $I_3$. The first and last elements of the field sequence identify the start and final node of the state machine. Thus, his the start node, and I2 is the final node.

To derive the token of a field, take the set of values belonging to a field and create a regular expression that recognizes all of them. For example, the input has the values "a" and "b" for the field $I_1$. These values may be generalized to the token LOWER HEX, representing the set of lowercase ASCII hexadecimal characters. Similarly, the values "1" and "2" of the field $I_2$ may eb generalized to the token DIGIT, the set '0' to '9'. Furthermore, $I_3$ and $I_4$ each have the single value ",", which is represented by the token CM, the token for the singeton set containing a comma.

From these steps, the state machine of FIG. 1 is derived.

Figure 4:
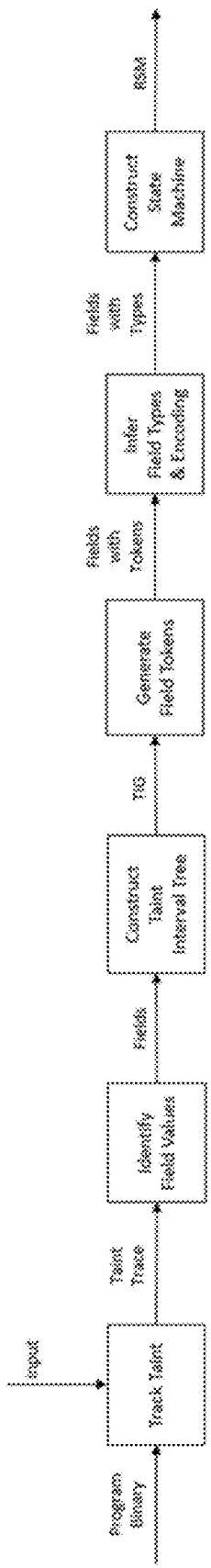
FIG. 4 provides a flowchart of the disclosed method to infer a recursive state machine.

Now in more detail, given a valid input and a binary program that processes the input data, the disclosed takes six steps, as shown in FIG. 4, to identify syntactic units in the input and construct an RSM of tokens. Each detailed step shall now be presented.

Track Taint. The method utilizes a dynamic taint tracking tool. In the preferred embodiment, the taint tracking tool comprises the following characteristics: (a) it maintains separate taints for each input from each data source; (b) it taints every byte in the input, where the taint includes the offset of the byte in the input; (c) it propagates taint through 8/16/32/64 bit instructions performing memory/register transfers; arithmetic, logic, and bitwise operations; bulk memory operations; and control transfer operations; (d) it traces taint through the CPU flags as well, treating each flag as an independent register; (e) it uses a pre-coded summary to propagate taint through several library functions for efficiency; (f) it tracks an abstracted calling context in which two active (recursive) calls from the same call site are considered to have the same context; otherwise, each unique sequence of active calls will have a unique context. The abstracted context distinguishes two invocations of the same instruction executed without recursion. However, if that instruction is executed twice in a recursive loop, it considers them to be executed in the same calling context. The dynamic taint tracking tool produces a taint trace which is a sequence of tuples <I, C, T> consisting of an instruction address I, the abstracted calling context C, and a set of taints T, where T is the union of all the taints of all the operands of the instruction during an invocation of the instruction. The tuples appear in the taint trace in the invocation order of the instructions.

Identify Field Values. This step addresses the problems of (a) identifying consecutive input bytes that make up the same value and (b) grouping different values that may belong to the same field.

Finding Values. A taint interval represents a range of offsets in the input. With Heuristic 1, every taint interval in the set Tin each tuple <I, C, T> in the taint trace is potentially a value of a field. The value of a taint interval is the raw sequence of bytes at the corresponding offsets in the input. Thus, the set of all unique taint intervals in the entire trace identifies the set of all values.

Grouping Values of the Same Field. A tuple <I, C, T> in the taint trace uses a collection of zero or more values, and each value is used by one or more tuples in the taint trace. We define the source index (SI) of a value as the set of all the instruction addresses, paired with the calling contexts, at which a value is used. That is, an SI of a taint interval $v$ is the largest set $\{(I_i, C_a), (I_j, C_b),\}$, such that for every pair $(I_n, C_x)$ there is a tuple $<I_n, C_x, T>$ in the trace such that the taint interval $v$ is contained in T, i.e, $v \subseteq T$. Then using Heuristic 2, each set of intervals with the same SI is said to be different values of the same field. In other words, an SI in a taint trace denotes a field. A field is a concept of the program not visible in the data. Thus, an SI links the raw bytes of an input to a concept in the program. Further, since SIs consists of instructions in the binary program, an SI also associates with the architecture-level instructions the fields of the input they operate upon. When an SI is associated with two or more unique values (different taint intervals), it is called a repeating SI. These SIs identify fields part of a repeating structure, such as an array, and play a special role in the state machine construction method.

Construct a Taint Interval Tree. Next add to the set of taint intervals an interval representing the entire input and construct a Taint Interval Graph (TIG) by transitive reduction of their subset relation. We convert this TIG into a tree by repeatedly doing the following: If a taint interval n in the TIG has two parents $p_1$ and $p_2$, that is, there exists n, $p_1$, and $p_2$ such that $n \subset p_1$, $n \subset p_2$, and $p_1 \cap p_2 \neq \phi$, replace the intervals $p_1$ and $p_2$ by $p_1'$, $p_2'$, and $p_x$ such that $p'_1 = p_1 - p_2$, $p'_2 = p_2 - p_1$, and $p_x = p_1 \cap p_2$. The next step is to make the tree complete. A tree is complete if every parent node in it is complete, that is for every node p with a non-empty set of children $c_1, c_2, \ldots, c_n$, $p = c_1 \cup c_2 \cup \ldots \cup c_n$, That a parent is not complete implies there are gaps in the interval covered by the parent and the children. We introduce gap intervals to make each parent complete.

The original intervals, those existing before conversion to tree, already have SIs associated with them. We assign SIs to the newly created intervals as follows. When splitting two overlapping intervals, the intervals $p'_1$ and $p_2'$, in the description above, are assigned the SIs $S_1$ and $S_2$ of the intervals $p_1$ and $p_2$, respectively. The interval $p_x$, representing the overlap between $p_1$ and $p_2$, is assigned an SI, that is union of the SIs of the original intervals $p_1$ and $p_2$. The gap intervals are assigned SIs using the SIs of the intervals of the predecessor or the successor or both, with optionally additional annotation that indicate whether a gap interval appears at the beginning or at the end of the sequence of children of a tree node.

Generate Field Tokens. A TIG node represents a specific value of a field. Collect the TIG nodes with the same SI and generalize their raw byte values to derive a token.

Infer Field Type. Afield is identified by an SI, a set of instructions. An instruction may be classified based on the type of computation it performs. For instance, x86 instructions ADD, SUB, DIV, XOR, etc. may be classified as arithmetic; the instructions like CMP, Jcc, and TEST may be classified as comparison; and MOVSB, MOVSW, and CALL instruction that invoke a string-related library function may be classified as string. Similarly, there may be other categories, such as floating, depending on the types supported by the architecture. The type of a field may be inferred from the type of instructions in its SI as follows. A field is of: (a) Numeric type, if its values are used in arithmetic but not in comparison instructions; or (b) String type, if its values are used in string instructions but not in arithmetic instructions. These two field types, Numeric and String, are application-agnostic. There may be other possible field types too. For a Numeric field, it is also helpful to determine its data encoding. When the join of all the bytes in all the values of a field produces the token DIGIT or a byte in the range [0x30, 0x39], it is ASCII decimal encoded, if it produces XDIGIT, LOWER HEX, UPPER HEX, or a byte in the range [0x30, 0x39], [0x41, 0x46], [0x61, 0x66], it is ASCII hex encoded. Otherwise, the encoding is Raw binary bytes.

Construct State Tree. Next, create the nodes and edges of the state machine from the taint interval tree.

Frontier of the TIG Tree. A TIG tree spans a range of offsets in the input corresponding to the interval of its root node. A frontier of a TIG tree is a set of TIG nodes whose intervals span the same range as the tree, and no offset in the input is covered by more than one interval. For instance, the singleton set consisting of only the root node is a frontier. Similarly, the set of all the leaf nodes is also a frontier. Since any node in a TIG tree is a tree, the concept of the frontier applies to every node. A TIG tree can have many frontiers, each decomposing an input into a different set of values. Each decomposition would be correct, as they span the entire input and thus produce a state machine that would correctly capture the specific input. However, state machines produced from two different frontiers of the same input may differ in their levels of abstraction. For instance, the frontier consisting of only the root node will produce a state machine with just one token, the original input. On the other hand, depending on how the program is written, the frontier consisting of just the leaf nodes may break multi-byte values of atomic fields into individual bytes. When a frontier contains too coarse a value, the method may be applied recursively to decompose it into a frontier and construct a finer-grained state machine.

Methods for Selecting Frontiers. The structure of a program's input is interesting when it has values that are part of an array or a recursive structure. If an input does not have such values, it implies that the program takes inputs with a fixed number of values, which is a trivial program. Two values of an array will have the same SI unless the program singles out at least one value to do something different. Thus, two or more nodes in the TIG tree with the same SI identify a repeating structure constructed via a loop or recursion.

A TIG node with an SI that repeats may have descendants that also have repeating SI. For instance, this may happen for nested arrays, that is, records consisting of arrays. Thus, to capture these complex relationships, we need to extract multiple frontiers. This can be done by an method that extracts the frontier with the topmost repeating SIs as follows: (1) starting from a given node, traverse the tree towards the children; (2) stop traversal when a node with repeating SI or a leaf node is reached; and (2) the set of nodes where the traversal stops forms the frontier with the topmost repeating SIs.

The method as applied to the TIG tree as follows: (1) Extract the frontier starting at the root node of the tree; put it in a set labeled main; and (2) For every TIG node n with repeating SI and at least one child, extract the frontier starting at n and put it in a set labeled s, where s is the SI of n. This yields a mapping of a name to a set of frontiers, where the name is either main or an SI. We call this a frontier partition. When an input has an arbitrary level of nesting, we first discover the topmost repeating SIs from the root of the TIG tree. Then, the method is recursively applied on nodes with a repeating SI to uncover the lower abstractions.

Construct State Machine from Frontier. A state machine may be computed for a frontier as follows:

Order TIG nodes in the frontier: Sort the nodes in the frontier on their start offsets (thus lining up the nodes so that their intervals cover the input from the first byte to the last byte).

Create nodes: For every unique SI in the frontier, create a node in the state machine. (This enables referring to a node in the state machine by the SI.)

Identify final nodes: Mark the SI of the last node in the frontier as the final node of the state machine.

Introduce a start node: Introduce a new node, refer to it as entry, mark it as the start node.

Annotate: Annotate each node with the token, type, and data encoding of its SI.

Add edges: For every pair of consecutive TIG nodes, t and ti+1 in the frontier, add an edge from node SI(t) to Row in the state machine, where SI(x) represents the SI of the TIG node x.

Add start edge: Add an edge from the node referenced as entry to the node SI(to) where to is the first node in the frontier.

The method may be applied to a frontier partition to create a state machine partition, which is a map from a name to a set of state machines.

Join State Machines. If multiple state machines have been created, they can be combined to create a single state machine that abstracts all. The method to join two state machines M1 and M2 to create a machine $M^{\ell}$ is as follows: (1) The nodes and edges of $M^{\ell}$ are the unions of nodes and edges of M1 and M2 with the name or SI used as an identifier to match corresponding nodes. The nodes of $M^{\ell}$ carry over the identifiers; (2) The final nodes of $M^{\ell}$ are the union of the final nodes of M1 and M2; (3) The token for a node in $M^{\ell}$ node is computed by joining the tokens of the corresponding nodes in M1 and M2, if the node is in both of them, else it is the token from the original node. The method may be applied to join the state machines for each SI in the state machine partition to produce a recursive state machine that is a mapping from a name to a state machine. Furthermore, the method may also be used to join RSMs produced from running the same program with different inputs.

For the purpose of understanding the METHOD FOR EXTRACTING THE STRUCTURE OF AN INPUT FOR A BINARY PROGRAM, references are made in the text to exemplary embodiments of a METHOD FOR EXTRACTING THE STRUCTURE OF AN INPUT FOR A BINARY PROGRAM, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

The invention claimed is:

1. A method for extracting a structure of a binary program, comprising:

(a) providing a state machine;

(b) providing one or more inputs comprising a serialized representation of a data structure, wherein said data structure comprises one or more fields and wherein such fields are atomic or composite;

wherein each atomic field of the data structure comprises one or more values, comprising a sequence of bytes;

wherein a token comprises an abstract representation of the values of the atomic field;

(c) producing a taint trace comprising a sequence of tuples, wherein the sequence of tuples comprises:

an instruction address;

an abstracted calling context; and a set of taints, comprising the union of all taints of all operands of an instruction during an invocation of the instruction;

(d) from the taint-trace, identifying the one or more field values and each field value's corresponding source index;

(e) constructing a taint interval tree;

(f) deriving one or more field tokens;

(g) classifying each of a set of instructions that accesses the one or more values of the field;

(h) inferring a field type for each set of instructions using the classifications of each set;

(i) constructing a structure transition graph; and (j) applying each of these steps recursively to construct a recursive state machine.

2. A method for extracting a structure of a binary program, comprising:

(a) providing a state machine, further comprising constructing a state machine from a frontier, comprising:

(i) ordering one or more taint interval graph nodes in the frontier according to their start offsets;

(ii) for each source index in the frontier, creating a node in the state machine;

(iii) marking the source index of the last node in the frontier as the final node of the state machine;

(iv) adding a new node;

(v) marking the new node as the start node;

(vi) annotating each node with the token, type, and data encoding of its respective source index;

(vii) adding edges to the taint interval graph; and (viii) adding a start edge;

(b) providing one or more inputs comprising a serialized representation of a data structure, wherein said data structure comprises one or more fields and wherein such fields are atomic or composite, and wherein a field may be a numeric type or a string type;

wherein each atomic field of the data structure comprises one or more values, comprising a sequence of bytes;

wherein a token comprises an abstract representation of the values of the atomic field;

(c) producing a taint trace comprising a sequence of tuples;

(d) from the taint-trace, identifying the one or more field values and each field value's corresponding source index;

(e) constructing a taint interval tree;

(f) deriving one or more field tokens;

(g) classifying each of a set of instructions that accesses the one or more values of the field;

(h) inferring a field type for each set of instructions using the classifications of each set;

(i) constructing a structure transition graph; and (i) applying each of these steps recursively to construct a recursive state machine.

\* \* \* \* \*